US012676465B2

(12) United States Patent
Steinberg et al.

(10) Patent No.: US 12,676,465 B2
(45) Date of Patent: Jul. 7, 2026

(54) HOLDING DEVICE FOR HOLDING A PAIR OF RIGID POWER LINES IN A SPACED MANNER

(71) Applicant: HELLERMANNTYTON GmbH &Co. KG, Tornesch (DE)

(72) Inventors: Lasse Steinberg, Hamburg (DE); Stephan Elger, Prisdorf (DE)

(73) Assignee: HellermannTyton GmbH & Co. KG, Tornesch (DE)

( * ) Notice: Subject to any disclaimer, the term of this patent is extended or adjusted under 35 U.S.C. 154(b) by 220 days.

(21) Appl. No.: 18/778,541

(22) Filed: Jul. 19, 2024

(65) Prior Publication Data

US 2025/0026285 A1      Jan. 23, 2025

(30) Foreign Application Priority Data

Jul. 21, 2023    (DE) .......................... 202023104101.9

(51) Int. Cl.
B60R 16/03         (2006.01)
H02G 3/32          (2006.01)

(52) U.S. Cl.
CPC .............. B60R 16/03 (2013.01); H02G 3/32 (2013.01)

(58) Field of Classification Search
CPC ...... B60R 16/03; B60R 16/0215; H02G 3/30; H02G 3/32
See application file for complete search history.

(56) References Cited

U.S. PATENT DOCUMENTS

| | | | |
|---|---|---|---|
| 6,565,049 | B2 | 5/2003 | Hahn |
| 2022/0041121 | A1* | 2/2022 | Hirakawa ................ H02G 3/04 |
| 2022/0060004 | A1* | 2/2022 | Kato ...................... H02G 3/045 |

FOREIGN PATENT DOCUMENTS

| | | |
|---|---|---|
| DE | 10144153 A1 | 3/2003 |
| DE | 102004042590 A1 | 3/2005 |
| DE | 202013007999 U1 | 1/2015 |
| DE | 102019211202 A1 | 2/2021 |

OTHER PUBLICATIONS

"Search Report", DE Application No. 202023104101.9—No translation available, Jun. 17, 2024, 5 pages.

* cited by examiner

*Primary Examiner* — Paresh Paghadal
(74) *Attorney, Agent, or Firm* — Colby Nipper PLLC

(57) ABSTRACT

The disclosure relates to a holding device for holding a pair of rigid power lines of rectangular cross-section in a vehicle. The holding device includes a fixing unit for fastening the holding device and a holding unit for holding the power lines on the holding device. The holding unit includes an inner-rib bar element and an inner-rib holding element. The inner-rib bar element has a main extension plane extending transversely to said power line paths and the inner-rib holding element is disposed along a common main extending direction of the inner-rib holding element and the inner-rib bar element on the inner-rib bar element. The inner-rib holding element has, along the main extension direction, at least a first section with a first abutment surface designed to abut against the first power line and at least a second section with a second abutment surface designed to abut against the second power line.

18 Claims, 4 Drawing Sheets

HOLDING DEVICE FOR HOLDING A PAIR OF RIGID POWER LINES IN A SPACED MANNER

FIELD OF INVENTION

The disclosure relates to a holding device for holding a pair of rigid power lines of rectangular cross-section in a vehicle, in particular a pair of rigid high-voltage power lines of rectangular cross-section in an electric vehicle, comprising a fixing unit for fixing the holding device and a holding unit for holding the power lines to the holding device.

BACKGROUND

In the field of mobility, especially in the field of electric mobility, rigid power lines, also known as busbars or "busbar cables", could prove to be a useful replacement for, or useful addition to the established flexible round power lines with cable braiding. This is especially true for high-voltage and/or high-current applications due to the more freely designable ratio of cross-sectional area to surface area. However, the lack of flexibility of the rigid power lines results in extreme requirements for the anti-shift protection of the holding devices for the power lines in corresponding vehicles. In addition to the known requirements for a holding device in the vehicle, such as vibration resistance, local overheating must also be prevented.

The technical task is therefore to mount rigid power lines in a vehicle in a simple and reliable way while preventing overheating.

OVERVIEW

This task is solved by the subject-matter of the independent claims. Advantageous embodiments result from the dependent claims, the description and the figures.

One aspect relates to a holding device for holding at least one pair of rigid power lines having a rectangular cross-section in a vehicle, in particular a pair of rigid high-voltage power lines having a rectangular cross-section in an electric vehicle. In particular, the electric vehicle has an electric drive motor. By a high voltage, a voltage of more than 60V, in particular more than 200V, preferably more than 300 or more than 700V may be understood. The vehicle may be a land-, air- and/or water-bound vehicle.

A rigid power line is in particular a power line with a homogeneous and/or solid metal core, for example made of aluminum or an aluminum alloy. A rigid power line may also be referred to as a conductor-wire braid-free power line. Rectangular cross-section power lines may have rounded corners and may in particular have an insulation, for example with a plastic coating such as a nylon polymer coating, for example PA12-($(CH_2)_{11}CNH]_n$) coating.

The holding device has a fixing unit for fixing the holding device to and/or in the vehicle. The fixing unit may also be referred to as a fixing or fastening foot. The fixing unit may have one or more corresponding fixing elements such as a lug, an eyelet, a through hole or the like for fixing the holding device to/in the vehicle, in particular a (bodyshell) of the vehicle.

Furthermore, the holding device has a holding unit for holding the power lines on the holding device. The holding unit can also be referred to as a holding or retaining head. The holding unit is preferably made in one piece with the fixing unit and arranged thereon. The holding unit has an inner rib with an inner-rib bar element and with an inner-rib holding element, which is arranged between a first power line path predetermined for the first power line of the pair and a second power line path predetermined for the second power line of the pair and thus between the power lines when used as intended, i.e. when the power lines are held by the holding device. The inner-rib bar element may also be referred to as inner-rib support element (for the inner-rib holding element). The power lines are preferably parallel and/or (next) adjacent power lines. Thus, at least in the area of the holding unit, first and second power line paths are preferably parallel and/or (next) adjacent power line paths. In particular, the holding unit is designed to hold the power lines with a shorter outer side, as viewed in the cross section of the power line, in the direction of the fixing unit. Accordingly, two of the, as viewed in the cross section, longer outer sides of the power lines are preferably oriented towards each other.

Here and in the following, the term "path" may refer, depending on the context, to the volume occupied by the respective power line when the holding device is used as intended, or to a direction followed by the power line in the area of the holding device (i.e. locally) when used as intended.

In particular, the inner rib can also be designed to protrude beyond the two power lines. The protruding part can then, for example, form part of the fixing structure described below or comprise part of this fixing structure. As will be explained later, the inner rib provides a secure, slip-free hold for the power lines at a predetermined minimum distance.

The inner-rib bar element has a main extension plane which runs transverse to the power line paths (and thus the power lines when used as intended). The inner-rib bar element can be designed with flat outer sides (i.e. flat) running parallel to the main extension plane.

The inner-rib holding element is arranged along a common main extension direction of the inner-rib holding element and the inner-rib bar element (which is also the main extension direction of the inner rib) on the inner-rib bar element, and thus runs along the inner-rib bar element. In particular, the main extension plane of the inner-rib holding element extends transversely to the main extension plane of the inner-rib bar element and along the first and/or second power line path. In particular, the main extension direction of the inner-rib bar element and/or inner-rib holding element runs in the respective associated main extension plane.

Accordingly, the inner rib with inner-rib holding element and inner-rib bar element can have a cruciform cross section in a sectional plane transverse to the common main extension direction, in particular over a large part (at least 50%, preferably at least 80%, particularly preferably at least 90%) of its length along the main extension direction. This is particularly advantageous from a manufacturing point of view, since undercuts can thus be avoided, which are relevant in the mold design of the corresponding injection mold.

Along the main extension direction, the inner-rib holding element has at least one first section (i.e. one or more first sections) with a respective first contact or abutment surface designed for (planar) contact with the first power line and at least one second section (i.e. one or more second sections) with a respective second contact or abutment surface designed for (planar) contact with the second power line. In contrast to the planar abutment of the inner-rib holding element, the inner-rib bar element may be formed with an edge, for example an edge separating the planar sides of the inner-rib bar element, for quasi-one-dimensional abutment against the first and/or second power line. The edge can protrude beyond the plane of the abutment surface for the respective associated power line and thus counteract slippage of the power line in the direction of the respective power line path by means of a local increase in contact pressure, for example on an insulation of the power line.

The inner-rib holding element is arranged in the first section at a predetermined minimum distance greater than zero from the second path (and thus from the second power line during intended use) and is arranged in the second section at a predetermined minimum distance greater than zero from the first path (and thus from the first power line during intended use). Accordingly, during intended use, the two power lines are kept spaced apart from each other, for example at a distance of 5 mm. Accordingly, the predetermined minimum distance may be, for example, at least 1 mm, preferably at least 2 mm or at least 3 mm. If the holding unit has a plurality of inner-rib elements with respective bar elements and holding elements, more than two power lines can also be kept spaced apart.

The described embodiment has the advantage that the spaced retention of the power lines allows the power lines to be cooled sufficiently. At the same time, the arrangement of the different sections of the inner-rib holding element prevents the holding device from slipping along the power lines, thus ensuring that the power lines are reliably held in a predefined position in the vehicle or, especially during assembly, that the holding device is precisely positioned on the power lines. This makes it particularly easy to install the power lines. Despite the spaced arrangement of the power lines, relative movements of the power lines with respect to each other are thus also minimized or prevented, which is also important for facilitating assembly in the vehicle. In addition, the arrangement described enables the holding device to be manufactured as a plastic injection-molded part without undercuts and thus makes it particularly easy to manufacture the holding device. Since the holding device can be made in one piece (except for the use of cable ties as generally available standard parts described in the next paragraph), mounting the power lines on the vehicle is particularly easy.

In one embodiment, the holding device, for fixing at least one cable tie closed around the holding unit and the pair of power lines, comprises a first fixing structure having a through-hole for the cable tie. For example, the through-hole may be configured for passing one cable tie or two cable ties therethrough. The through-hole may extend transversely to a main extension plane of the power lines. The through-hole can be sufficiently large to allow the use of an automatic bundling tool for cable ties. This simplifies the automation of the assembly. For example, the through opening may be located in an intermediate area between the holding unit and the fixing unit. This has the advantage of further simplifying assembly by using the cable tie or ties as standard parts, with the fixing structure achieving particularly secure holding, for example with a predetermined contact pressure of the power lines against the inner-rib holding element and/or inner-rib bar element.

In a further embodiment, the holding unit, for fixing at least one cable tie closed around the holding unit and the pair of power lines, is provided with a second fixing structure having a protrusion, the protrusion being arranged at a free end of the inner-rib bar element and/or the inner-rib holding element, which end is diametrically remote from the fixing unit (i.e., as viewed along the main extension direction), and projecting beyond the power lines in the main extension direction when used as intended. When designed for two cable ties, the protrusion may be arranged between the respective paths of the cable ties or between the two cable ties. This has the advantage of further increasing the reliability of the holding device and the simplicity of assembly.

In one embodiment, it is provided that between at least some of the (i.e., some of the or the) respective first and second sections of the inner-rib holding element, an intermediate section is arranged in which the inner-rib holding element is arranged at a predetermined minimum distance greater than zero from the first path and from the second path. This has the advantage that the first and second abutment surfaces can be arranged at a distance from each other and can be designed independently of each other, so that cooling is not impaired while adhesion of the holding device to the power lines is ensured. In addition, the intermediate section prevents foreign matter from entering the space between the power lines, which could result in local overheating.

It may be provided that the inner-rib holding element, in the respective intermediate section(s), runs parallel to the first and/or second abutment surface(s) to a large extent. This has the advantage that the stability of the inner rib and thus the reliability of the holding device and the simplicity of assembly are further increased.

It can also be provided that the intermediate section, along the main extension direction of the inner-rib holding element, is at least half as large, preferably at least as large, particularly preferably at least one and a half times as large as the first and/or the second section. The size of the first and/or second section may be predetermined by the size of the abutment surface. The size of the intermediate section can be predetermined by the size of the remaining inner-rib holding element between the respective associated first and second sections. The specified sizes have proven to be particularly advantageous in terms of reliability (slip resistance, ease of assembly, heat dissipation).

In a further embodiment, it is provided that the inner-rib holding element is a two-part inner-rib holding element with a first segment and with a second segment, the two segments being separated at least in sections by the inner-rib bar element. Thus, the inner-rib bar element may be arranged, in a direction transverse to the common main extension direction, between the two segments. Preferably, the two segments are symmetrical with respect to the inner-rib bar element, i.e. the main extension plane of the inner-rib bar element. This has the advantage of improving heat dissipation in the area of the inner-rib holding element as well as stability, in particular for the second fixing structure.

In one embodiment, it is provided that the holding device is manufactured as an injection molded plastic part, optionally with one or more molded-in metal parts such as eyelets, bushings and the like. The cast-in metal part or parts may comprise, for example, a heat-embedded metal bushing, generally of material 11SMnPb30. In particular, at least inner-rib bar element and inner-rib holding element may be integrally fabricated. Preferably, at least the holding unit is manufactured in one piece, particularly preferably at least the holding unit and the fixing unit. The holding unit can thereby comprise or form inner-rib bar element and inner-rib holding element and the outer-rib holding elements described in the following paragraph. This makes manufacture and use of the holding unit particularly simple.

In a further embodiment, it is provided that the holding unit has a first outer-rib holding element and/or a second outer-rib holding element, which each extend from the fixing unit along the common main extension direction of the inner-rib bar element and inner-rib holding element (and thus transversely to the first and second path of the power lines, respectively). In this case, the first outer-rib holding element then has a first outer abutment surface formed for contact with the first power line, which is oriented in the opposite direction to the first abutment surface of the inner-rib holding element. The second outer-rib holding element then has a second outer abutment surface designed for contact with the second power line, which is oriented opposite to the second abutment surface of the inner-rib holding element. The abutment surfaces are preferably flat. The orientation of the respective surfaces can be determined by a respective associated normal vector. The power lines can thus preferably be inserted with their respective shorter outer sides (when viewed in cross section) first into the areas provided for this purpose between the inner-rib holding element and the respective outer-rib holding elements. This has the advantage that the power lines are held even more reliably. In particular, damage to the power lines or their insulation is avoided, allowing even greater tightening forces for the cable ties. This also further improves slip resistance. Further structures can also be attached to the outer-rib holding elements, for example clips for further (power) lines or the structures described below, which further increase the reliability of the holding unit.

One or more anti-slip structures (preferably running transversely to the power line path of the respective power lines) can be provided on one or more of the preferably flat or otherwise flat outer abutment surfaces. The anti-slip structure(s) can, for example, be arranged in an area enclosed in each case by the associated closed cable tie(s), as a result of which the contact pressure of the respective anti-slip structure on the power line is increased. This has the advantage of further improving the reliability of the holding device.

Thus, it may be provided that the holding unit, for fixing at least one cable tie closed around the holding unit and the pair of power lines, comprises a third fixing structure having a first and/or second protrusion, the respective protrusion being arranged at a free end of the first and second outer-rib holding elements, respectively, which end is diametrically remote from the fixing unit, and protrudes beyond the power lines in a main extension direction of the respective outer-rib holding elements when used as intended. When designed for two cable ties, the protrusion may be arranged between the respective paths of the cable ties or between the two cable ties. This has the advantage of further increasing the reliability of the holding device and the simplicity of assembly.

It may also be provided that the holding unit, for fixing at least one cable tie closed around the holding unit and the pair of power lines, has a fourth fixing structure with further projections, the respective projections being arranged on a respective outer side of the first and/or second outer-rib holding element facing away from the paths of the power lines. Preferably, the further projections are arranged on or at least in the region of an edge of the respective outer-rib holding elements in order to prevent the cable tie or ties from slipping off the respective outer-rib holding elements. This has the advantage that the reliability of the holding device and the simplicity of assembly are further increased.

Another aspect relates to rigid power lines having a rectangular cross-section, which are attached to a holding device according to any one of the preceding embodiments by means of at least one cable tie.

Still another aspect relates to vehicle having a holding device according to any of the described embodiments or having the described power lines.

A supplementary aspect relates to a method for securing or fixing a pair of rigid power lines of rectangular cross-section in a vehicle, in particular for automatically securing or fixing a pair of rigid power lines of rectangular cross-section in a vehicle, comprising the method steps: a) arranging the pair of rigid power lines on the abutment surfaces of a holding device according to one of the described embodiments; b) respectively closing at least one cable tie around the pair of power lines and the holding unit of the holding device and thus pressing the power lines against the holding unit by the respective cable tie; and c) fastening the holding device to the vehicle. Preferably, the method steps are thereby performed in the order indicated.

Advantages and advantageous embodiments of the latter aspects corresponding to the advantages and advantageous embodiments described for the holding device, and vice versa.

The described features and combinations of features, including those of the general introduction, as well as the features and combinations of features disclosed in the figure description or in the figures alone, can be used not only alone or in the described combination, but also with other features or without some of the disclosed features, without leaving the scope of the invention. Consequently, embodiments are also part of the invention which are not explicitly shown and described in the figures, but which can be produced by separately combining the individual features disclosed in the figures. Therefore, embodiments and combinations of features that do not comprise all features of an originally formulated independent claim are also to be considered disclosed. Furthermore, embodiments and combinations of features are to be considered disclosed which deviate from or go beyond the combinations of features described in the dependencies of the claims.

In the context of the present disclosure, "transverse/parallel" can be understood as "at least substantially vertical/parallel", i.e. "vertical/parallel" or "substantially vertical/parallel", i.e. vertical/parallel except for a predetermined deviation. For example, the predetermined deviation may be at most 15°, preferably at most 5°, particularly preferably at most 3°. Accordingly, "oppositely oriented" may be understood in the context of the present disclosure as "at least substantially oppositely oriented", i.e. "at least substantially antiparallel oriented".

BRIEF DESCRIPTION OF THE DRAWINGS

Example embodiments are described in more detail below with reference to schematic drawings. Therein

In the figures, the same or functionally identical features are provided with the same reference signs.

DETAILED DESCRIPTION

Figure 1A:
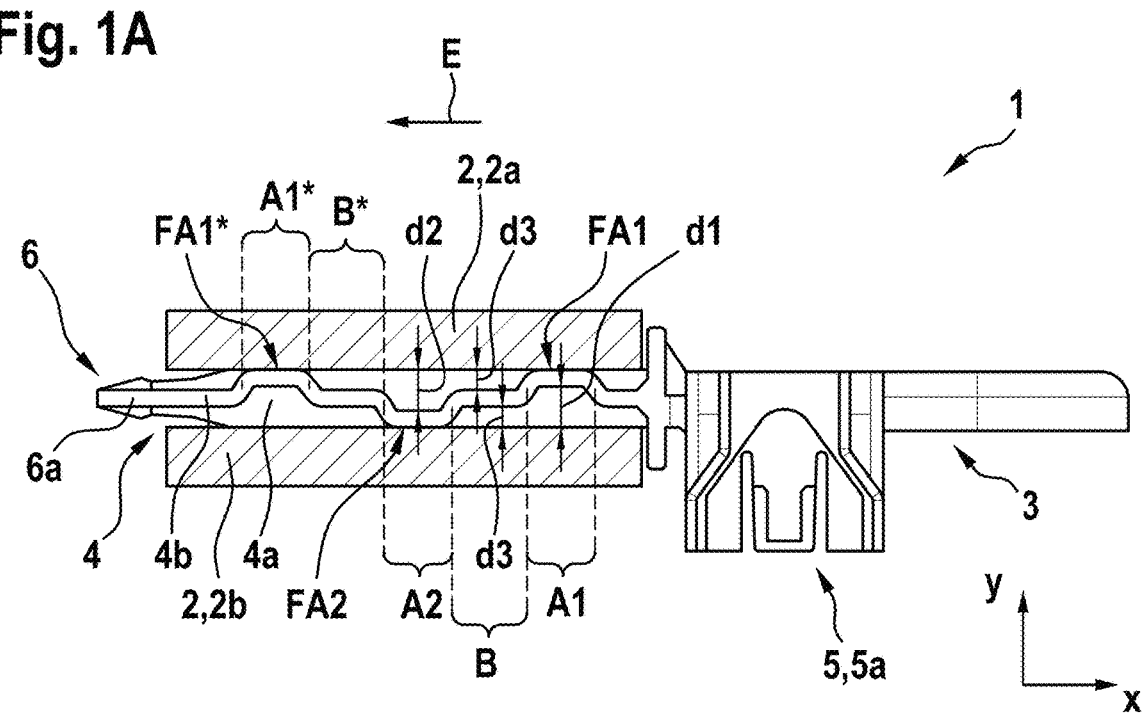
FIGS. 1A-1B show first example embodiment of a holding device in different perspectives.

FIG. 1A shows a holding device 1 for holding a pair 2 of rigid power lines 2a, 2b with a rectangular cross-section in a vehicle. The holding device 1 has a fixing unit 3 for fixing the holding device 1 to or in the vehicle and a holding unit 4 for holding the power lines 2a, 2b on the holding device 1.

The holding unit 4 has an inner-rib bar element 4a and an inner-rib holding element 4b, both of which are arranged between a first power line path specified for the first power line 2a of the pair 2 and a second power line path specified for the second power line 2b of the pair 2. The inner-rib bar element 4a has a main extension plane which extends transversely to the power line paths in the region of the holding device and thus, in the present case, in the x-y plane. The inner-rib holding element 4b is arranged on the inner-rib bar element 4a along a common main extension direction E, which here runs in the negative x-direction, of inner-rib holding element 4b and of inner-rib bar element 4a.

The inner-rib holding element 4b has, as viewed along the main extension direction E, at least one, in this case two, first sections A1, A1* with respective first abutment surfaces FA1, FA1* formed for contact with the first power line 2a, and at least one second section A2 with a second abutment surface FA2 formed for contact with the second power line 2b. The abutment surfaces FA1, FA1*, FA2 here are flat abutment surfaces FA1, FA1*, FA2 which run plane in the x-z plane. In this case, the inner-rib holding element 4b is arranged in the first section A1, A1* at a predetermined minimum distance d1 greater than zero from the second path (and thus, when used as intended, from the second power line 2b) and is arranged in the second section A2 at a predetermined minimum distance d2 greater than zero from the first path (and thus, when used as intended, from the first power line 2a). In this way, a predetermined distance between the power lines 2a, 2b with good heat dissipation is reliably achieved in a simple manner.

At least one, in the example shown two, respective intermediate sections B, B* are arranged between respective first and second sections A1, A1*, A2 of the inner-rib holding element 4b, in which the inner-rib holding element 4b is arranged at a predetermined minimum distance d3 greater than zero from the first path and from the second path and thus from both power lines 2a, 2b. In the intermediate sections B, B*, the inner-rib holding element 4b here runs parallel to the respective abutment surfaces FA1, FA1*, FA2 to a large extent. Here, the intermediate sections B, B* are, along the main extension direction E of the inner-rib holding element 4b, as large as the first and second sections A1, A1*, A2, which are of the same size in the example shown.

Figure 1B:
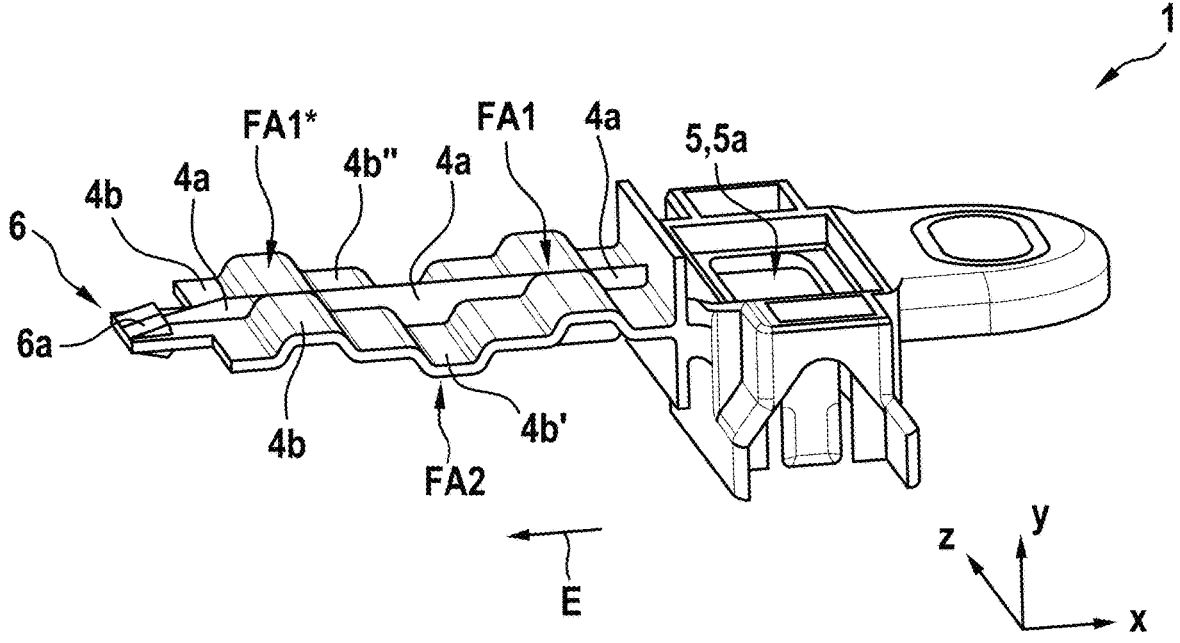

As shown in FIG. 1B, the inner-rib holding element 4b is presently a two-part inner-rib holding element 4b with a first segment 4b' and with a second segment 4b", the two segments 4b', 4b" being separated at least in some region by the inner-rib bar element 4a. In the example shown, the holding unit 4 thus has a cruciform cross-section in a plane transverse to the main direction of extension E in the intermediate sections B, B* and a T-shaped cross-section in the sections A1, A1*, A2. Not shown is a possible variant in which the inner-rib bar element 4a in the region of the abutment surfaces FA1, FA1*, FA2 protrudes in the positive or negative y-direction over the respective abutment surface FA1, FA1*, FA2 and thus forms an anti-slip structure in the form, for example, of a rib running transversely to the power line path of the power lines 2a, 2b.

In the present embodiment, the holding device 1 has, for fixing at least one, here two, cable ties 11a, 11b closed around the holding unit 4 and the pair 2 of power lines 2a, 2b (FIGS. 2C, 2D), a first fixing structure 5 with a through-hole 5a for the cable ties 11a, 11b. The through-hole 5a is thereby large compared to the dimensions of the cable ties 11a, 11b, so that the cable ties 11a, 11b can be closed here around the holding unit 4 and power lines 2a, 2b with an automatic binding or bundling tool.

Here, the holding unit 4 has, for fixing the cable ties 11a, 11b, a second fixing structure 6 with a projection 6a, the projection 6a being arranged at a free end, here of the inner-rib bar element 4a and the inner-rib holding element 4b, remote from the fixing unit 3 and projecting in the main extension direction E (here the negative x-direction) over the power lines 2a, 2b when used as intended. As can be seen, for example, from FIGS. 2C, 2D, slippage of the cable ties 11a, 11b can thus be prevented at least in each case in a direction (here either positive or negative z-direction) transverse to the main direction of extension E. As also shown in FIGS. 2C, 2D, the projection 6a is arranged in the z-direction between the cable ties 11a, 11b when used as intended with two cable ties 11a, 11b.

Figure 2A:
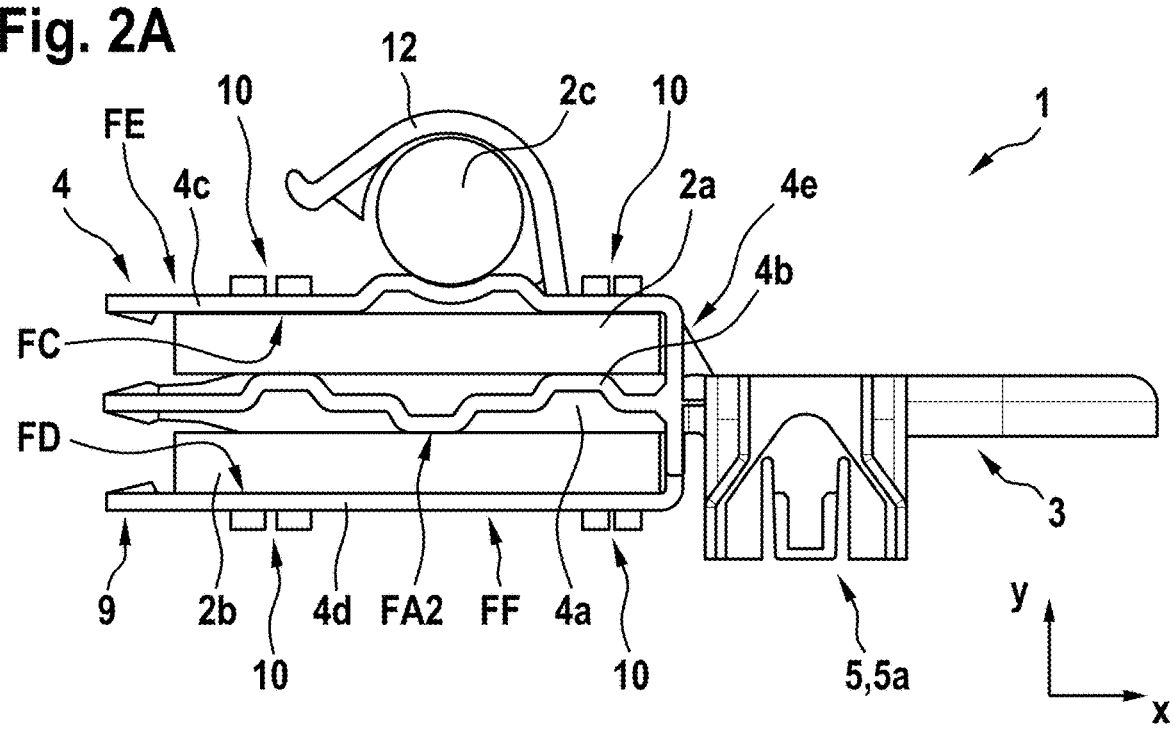
FIGS. 2A-2D how second example embodiment of a holding device in various perspectives and configurations.

In FIG. 2A, analogous to the illustration in FIG. 1A, a further embodiment is shown. In addition to some or possibly all of the features shown in FIG. 1A, this embodiment has a first outer-rib holding element 4c and here also a second outer-rib holding element 4d. These extend in each case starting from the fixing unit 3 along the main extension direction E transversely to the first and second power line paths respectively, i.e. the power lines 2a, 2b. A neck region 4c, in which the outer-rib holding elements 4c, 4d as well as the inner-rib bar element 4a and inner-rib holding element 4b unite, is thus arranged in the main direction of extension between the power line paths or the power lines 2a, 2b and the fixing unit 3 here.

The first outer-rib holding element 4c has a first outer abutment surface FC designed for contact with the first power line 2a, which is oriented opposite to the first abutment surfaces FA1, FA1* of the inner-rib holding element 4b. The second outer-rib holding element 4d has a second outer abutment surface FD designed for contact with the second power line 2b, which is oriented opposite to the second abutment surface FA2 of the inner-rib holding element 4b.

Figure 2B:
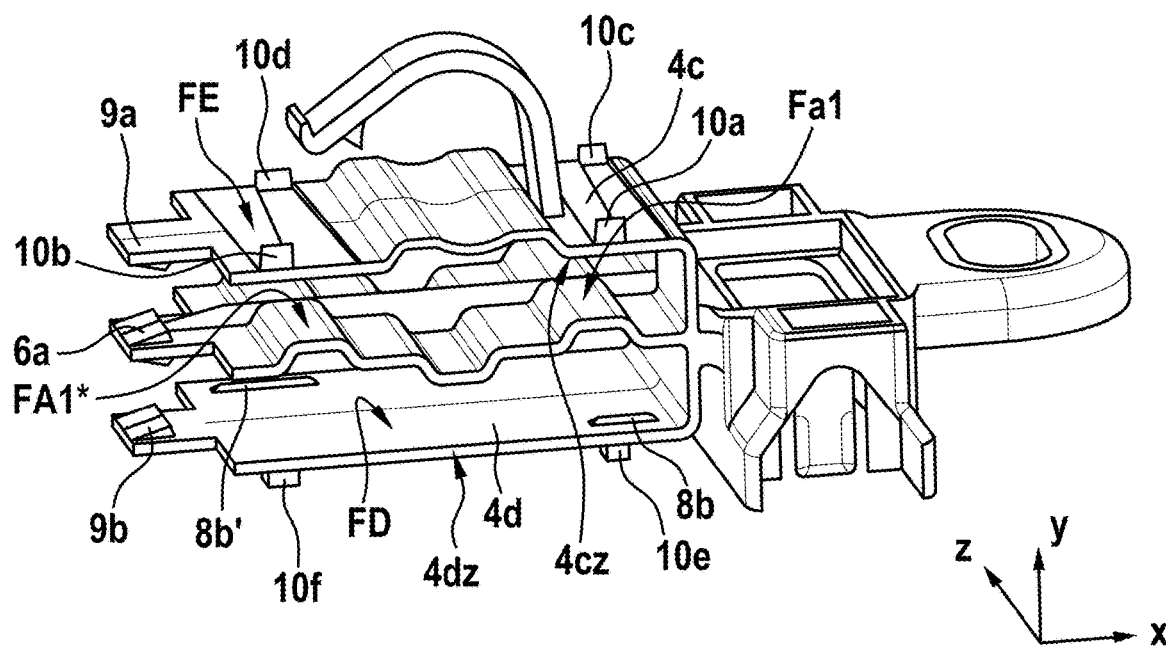
Figure 2C:
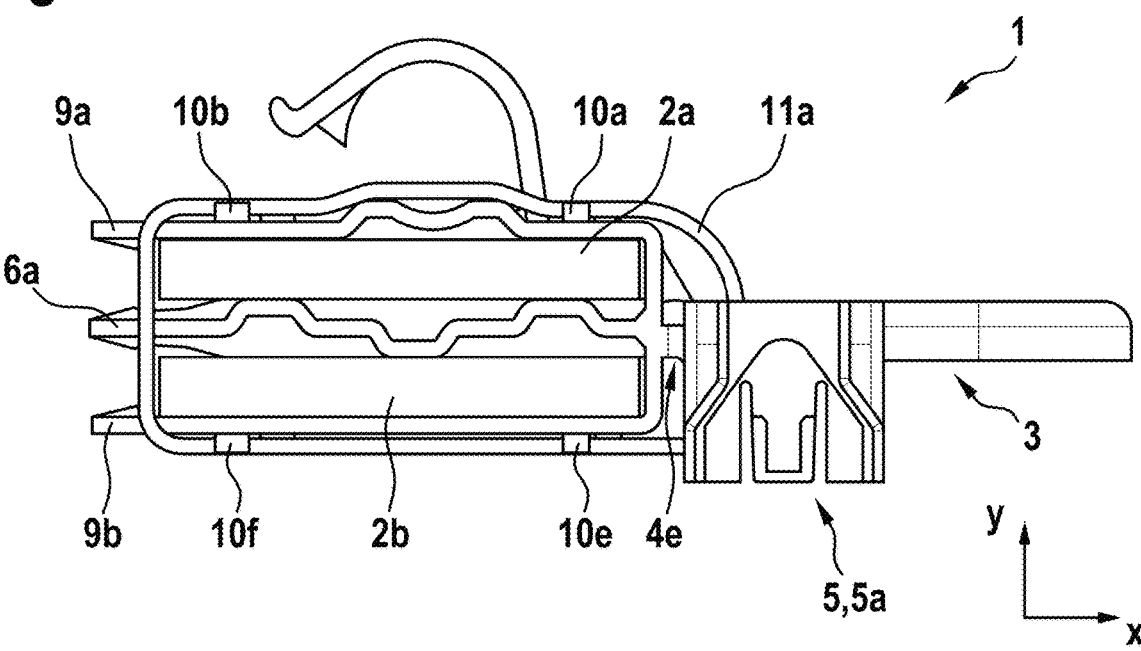
Figure 2D:
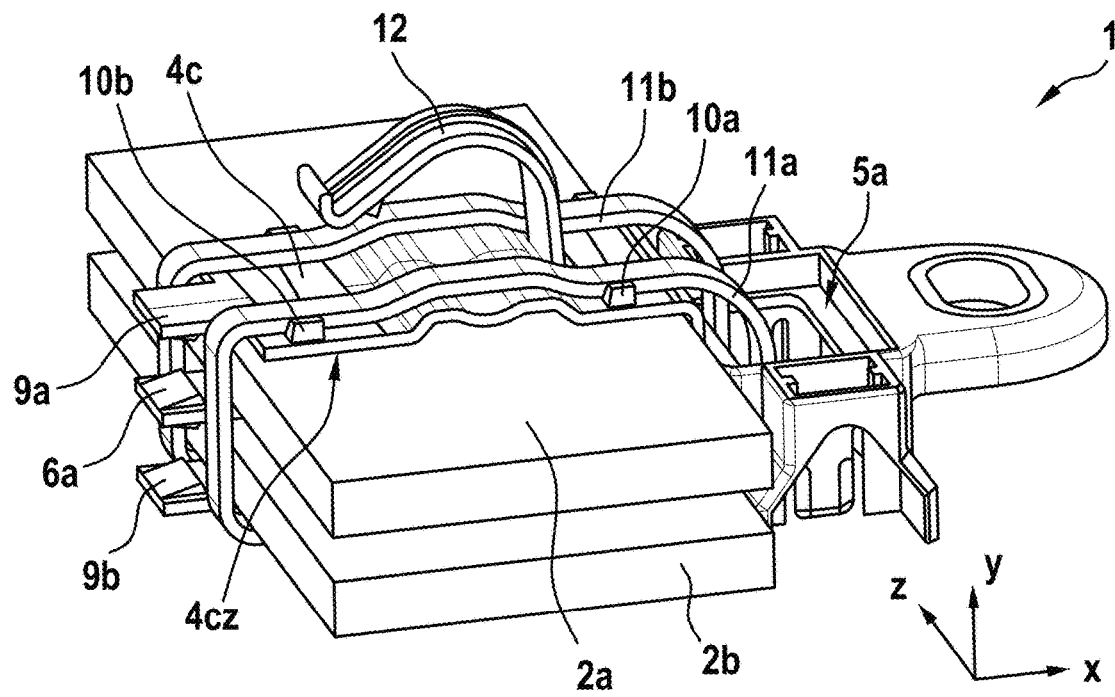

As shown in FIG. 2B, one or more anti-slip structures 8b, 8b' can be provided on one or more of the—here otherwise flat—outer abutment surfaces FC, FD. In the present case, these are designed as ribs which are raised relative to the outer abutment surfaces FC, FD and which extend mainly, i.e. in their respective main direction of extension, transversely to the power line path of the power lines 2a, 2b.

Presently, the holding unit 4 has, for fixing the cable ties 11a, 11b, a third fixing structure 9 with a first and/or second projection 9a, 9b, the respective projection 9a, 9b being arranged at a free end of the first and second outer-rib holding elements 4c, 4d, respectively, which end is most remote from the fixing unit 3, and, when used as intended, protruding in the main extension direction E of the respective outer-rib holding elements 4c, 4d over the power lines 2a, 2b. The protrusions 9a, 9b here act analogously to the previous protrusion 6a and thus further contribute to reliability.

To further increase reliability, the holding unit 4 has, for fixing the cable ties 11a, 11b, a fourth fixing structure 10 with further projections 10a-10f, the respective projections 10a-10f being arranged on a respective outer side FE, FF of the first and/or second outer-rib holding element 4c, 4d facing away from the power line paths of the power lines 2a, 2b. Here, the projections 10a-10f are respectively arranged case in the region of edges 4cz, 4dz of the respective outer-rib holding elements 4c, 4d extending transversely to the power line paths of the power lines 2a, 2b, so as to prevent the cable ties 10a, 10b from slipping over the edges 4cz, 4dz away from the holding unit 4 (cf. FIGS. 2C, 2D).

Figure 3A:
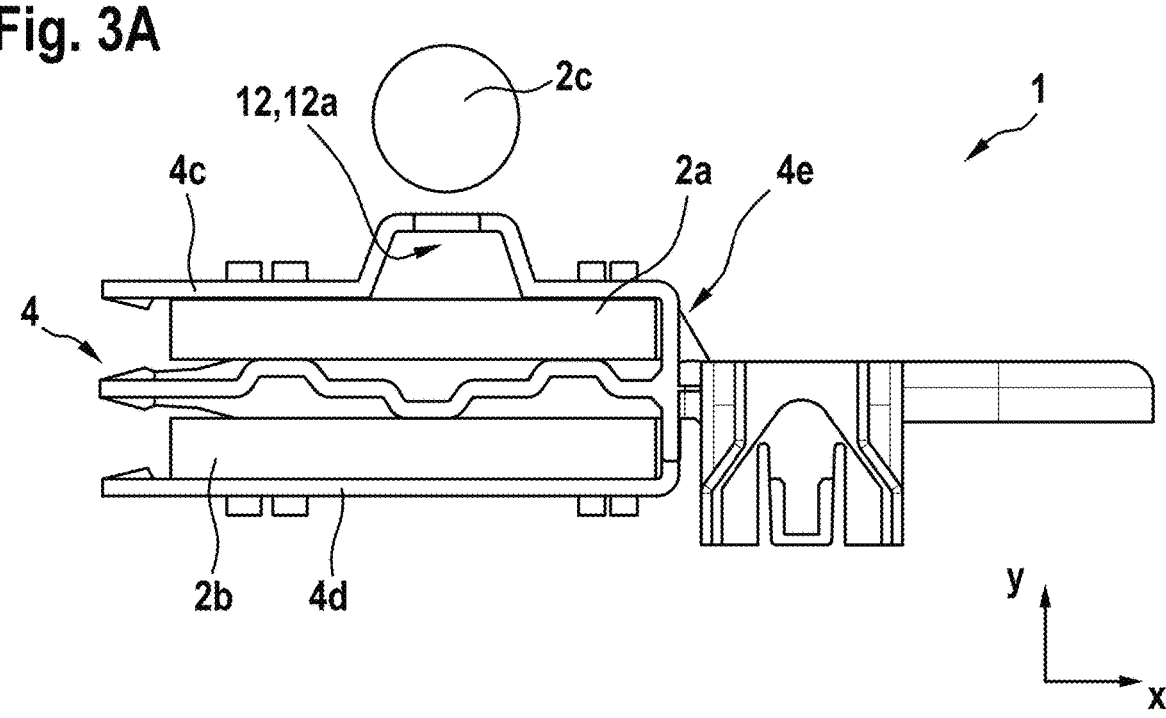
FIGS. 3A-3B show a third example embodiment of a holding device in different perspectives.
Figure 3B:
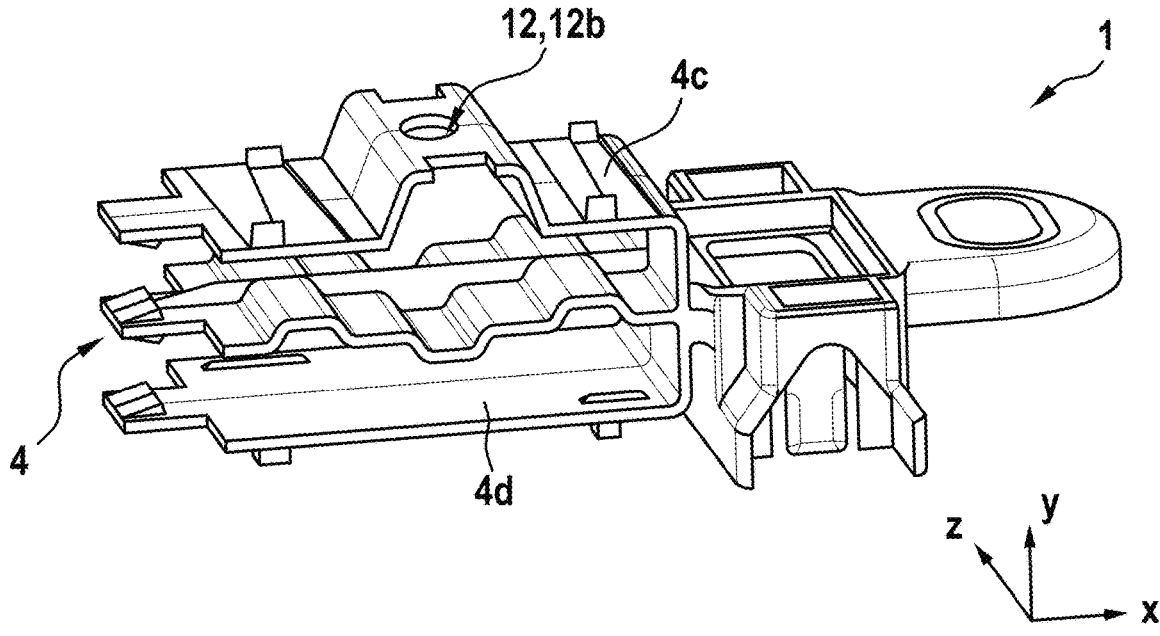

One or more further structures 12 may be attached to the outer-rib holding elements 4c, 4d. In FIGS. 2C, 2D, for example, these are one or more clips or clamps for further (power) lines 2c. FIGS. 3A, 3B again show another possible embodiment with some or all of the features shown in the preceding Figures. The further structure 12 there comprises, by way of example, an eyelet 12a which can be used for a further cable tie, and a through-hole 12b for a mushroom head.

ADDITIONAL EXAMPLES

Example 1. A holding device (1) for holding a pair (2) of rigid power lines (2a, 2b) of rectangular cross-section in a vehicle, in particular a pair (2) of rigid high-voltage power lines (2a, 2b) of rectangular cross-section in an electric vehicle, comprising a fixing unit (3) for fixing the holding device (1); a holding unit (4) for holding the power lines (2a, 2b) to the holding device (1); characterized in that the holding unit (4) comprises inner-rib bar element (4a) and an inner-rib holding element (4b), both of which are arranged between a first power line path predetermined for the first power line (2a) of the pair (2) and a second power line path predetermined for the second power line (2b) of the pair (2); wherein the inner-rib bar element (4a) has a main extension plane which is transverse to the power line paths; and the inner-rib holding element (4b) is arranged along a common main extension direction (E) of the inner-rib holding element (4b) and of the inner-rib bar element (4a) on the inner-rib bar element (4a); and the inner-rib holding element (4b) has, along the main extension direction (E), at least a first section (A1, A1*) with a first abutment surface (FA1, FA1*) designed to abut against the first power line (2a) and at least a second section (A2) with a second abutment surface (FA2) designed to abut against the second power line (2b); wherein the inner-rib holding element (4b) is arranged in the first section (A1, A1*) at a predetermined minimum distance (d1) greater than zero from the second power line path and is arranged in the second section (A2) at a predetermined minimum distance (d2) greater than zero from the first power line path.

Example 2. Holding device (1) according to Example 1, characterized in that the holding device (1) comprises, for fixing a cable tie (11a, 11b) closed around the holding unit (4) and the pair (2) of power lines (2a, 2b), a first fixing structure (5) having a through-hole (5a) for the cable tie or the cable ties (11a, 11b).

Example 3. Holding device (1) according to any one of the preceding Examples, characterized in that the holding unit (4) comprises, for fixing a cable tie (11a, 11b) closed around the holding unit (4) and the pair (2) of power lines (2a, 2b), a second fixing structure (6) having a projection (6a), wherein the projection (6a) is arranged at a free end of the inner-rib stay member (4a) and/or the inner-rib holding element (4b) remote from the fixing unit (3) and protrudes above the power lines (2a, 2b) when used as intended.

Example 4. Holding device (1) according to any one of the preceding Examples, characterized in that between respective first and second sections (A1, A1*, A2) of the inner-rib holding element (4b) an intermediate section (B) is arranged, in which the inner-rib holding element (4b) is arranged at a predetermined minimum distance (d3) greater than zero from the first power line path and from the second power line path.

Example 5. Holding device (1) according to the preceding Example, characterized in that the inner-rib holding element (4b) in the respective intermediate section or sections (B) runs to a large extent parallel to the first and/or second abutment surface or surfaces (FA1, FA1*, FA2).

Example 6. Holding device (1) according to any one of the two preceding Examples, characterized in that the intermediate section (B), along the main extension direction (E) of the inner-rib holding element (4b), is at least half as large, preferably at least as large, particularly preferably at least one and a half times as large as the first and/or the second section (A1, A1*, A2).

Example 7. Holding device (1) according to any one of the preceding Examples, characterized in that the inner-rib holding element (4b) is a two-part inner-rib holding element (4b) having a first segment (4b') and having a second segment (4b"), the two segments (4b', 4b") being separated at least in sections by the inner-rib bar element (4a).

Example 8. Holding device (1) according to any one of the preceding Examples, characterized in that the holding device (1) is manufactured as a plastic injection-molded part and, in particular, at least the inner-rib bar element (4a) and inner-rib holding element (4b) are manufactured in one piece, preferably at least the holding unit (4) is manufactured in one piece, particularly preferably at least the holding unit (4) and fixing unit (3) are manufactured in one piece.

Example 9. Holding device (1) according to any one of the preceding Examples, characterized in that the holding unit (4) has a first outer-rib holding element (4c) and/or a second outer-rib holding element (4d), which each extend, starting from the fixing unit (3), along the main extension direction (E) of the inner-rib bar element (4a) and inner-rib holding element (4b) and thus transversely to the first and second power line path, respectively; wherein the first outer-rib holding element (4c) has a first outer abutment surface (FC) which is formed for abutment against the first power line (2a) and is oriented in the opposite direction to the first abutment surface (FA1, FA1*) of the inner-rib holding element (4b); and/or the second outer-rib holding element (4d) has a second outer abutment surface (FD) which is designed for contact with the second power line (2b) and is oriented in the opposite direction to the second abutment surface (FA2) of the inner-rib holding element (4b).

Example 10. Holding device (1) according to the preceding Example, characterized in that one or more anti-slip structures are provided on one or more of the in particular otherwise flat outer abutment surfaces.

Example 11. Holding device (1) according to any one of the two preceding Examples, characterized in that the holding unit (4) comprises, for fixing a cable tie (11a, 11b) closed around the holding unit (4) and the pair (2) of power lines (2a, 2b), a third fixing structure (9) with a first and/or second projection (9a, 9b), wherein the respective projection (9a, 9b) is arranged at a free end of the first and second outer-rib holding elements (4c, 4d), respectively, remote from the fixing unit (3), and projects beyond the power lines (2a, 2b) in a main extension direction (E) of the respective outer-rib holding elements (4c, 4d) when used as intended.

Example 12. Holding device (1) according to any one of the preceding three claims, characterized in that the holding unit (4) has, for fixing a cable tie (11a, 11b), a fourth fixing structure (10) with further projections (10a-10f), the respective projections (10a-10f) being arranged on a respective outer side (FE, FF) of the first and/or second outer-rib holding element (4c, 4d) facing away from the paths of the power lines (2a, 2b).

Example 13. Rigid power lines (2a, 2b), which are attached to a holding device (1) according to any one of the preceding Examples by means of at least one cable tie (11a, 11b), in particular attached to a holding unit (4) of a holding device (1) according to one of the preceding claims.

Example 14. Vehicle with a holding device (1) according to any of Examples 1-12 or power lines (2a, 2b) according to claim 13.

Example 15. Method for fastening a pair (2) of rigid power lines (2a, 2b) of rectangular cross-section in a vehicle, in particular for the automated fastening of a pair (2) of rigid power lines (2a, 2b) of rectangular cross-section in a vehicle, comprising the method steps: a) arranging the pair (2) of rigid power lines (2a, 2b) on the abutment surfaces (FA1, FA1*, FA2) of a holding device (1) according to one of Examples 1-12; b) respectively closing at least one cable tie (11a, 11b) around the pair (2) of power lines (2a, 2b) and the holding unit (4) of the holding device (1) and thus pressing the power lines (2a, 2b) against the holding unit (4) by the respective cable tie; c) fastening the holding device (1) to the vehicle.

What is claimed is:

1. A holding device for holding a pair of rigid power lines of rectangular cross-section in a vehicle, the holding device comprising:
   a fixing unit for fixing the holding device;
   a holding unit for holding the power lines to the holding device;
   wherein the holding unit comprises an inner-rib bar element and an inner-rib holding element, both of which are arranged between a first power line path predetermined for the first power line of the pair and a second power line path predetermined for the second power line of the pair;
   wherein the inner-rib bar element has a main extension plane that is transverse to the power line paths;
   wherein the inner-rib holding element is arranged along a common main extension direction of the inner-rib holding element and of the inner-rib bar element on the inner-rib bar element;
   wherein the inner-rib holding element has, along the main extension direction, at least a first section with a first abutment surface designed to abut against the first power line and at least a second section with a second abutment surface designed to abut against the second power line; and
   wherein the inner-rib holding element is arranged in the first section at a predetermined minimum distance greater than zero from the second power line path and is arranged in the second section at a predetermined minimum distance greater than zero from the first power line path.

2. The holding device according to claim 1, wherein the holding device further comprises, for fixing a cable tie closed around the holding unit and the pair of power lines, a first fixing structure having a through-hole for the cable tie.

3. The holding device according to claim 1, wherein the holding unit further comprises, for fixing a cable tie closed around the holding unit and the pair of power lines, a second fixing structure having a projection, wherein the projection is arranged at a free end of at least one of the inner-rib stay member or the inner-rib holding element remote from the fixing unit and protrudes above the power lines.

4. The holding device according claim 1, wherein between respective first and second sections of the inner-rib holding element an intermediate section is arranged, in which the inner-rib holding element is arranged at a predetermined minimum distance greater than zero from the first power line path and from the second power line path.

5. The holding device according to claim 4, wherein the intermediate section, along the main extension direction of the inner-rib holding element, is at least half as large as at least one of the first section or the second section.

6. The holding device according to claim 1, wherein the inner-rib holding element in the respective intermediate section or sections runs to a large extent parallel to at least one of the first abutment surface or the second abutment surface.

7. The holding device according to claim 6, wherein the intermediate section, along the main extension direction of the inner-rib holding element, is at least half as large as at least one of the first section or the second section.

8. The holding device according to claim 1, wherein the inner-rib holding element is a two-part inner-rib holding element having a first segment and having a second segment, the two segments being separated at least in sections by the inner-rib bar element.

9. The holding device according to claim 1, wherein the holding device is manufactured as a plastic injection-molded part and at least one of:
   the inner-rib bar element and inner-rib holding element are manufactured in one piece;
   the holding unit is manufactured in one piece; or
   the holding unit and the fixing unit are manufactured in one piece.

10. The holding device according to claim 1, further comprising at least one of:
   wherein the holding unit has at least one of a first outer-rib holding element or a second outer-rib holding element, which each extend, starting from the fixing unit, along the main extension direction of the inner-rib bar element and inner-rib holding element and thus transversely to the first and second power line path, respectively;
   wherein the first outer-rib holding element has a first outer abutment surface which is formed for abutment against the first power line and is oriented in the opposite direction to the first abutment surface of the inner-rib holding element; or
   wherein the second outer-rib holding element has a second outer abutment surface which is designed for contact with the second power line and is oriented in the opposite direction to the second abutment surface of the inner-rib holding element.

11. The holding device according to claim 10, wherein the holding unit comprises, for fixing a cable tie closed around the holding unit and the pair of power lines, a third fixing structure with at least one of a first projection or a second projection, wherein the respective projection is arranged at a free end of the first and second outer-rib holding elements, respectively, remote from the fixing unit, and projects beyond the power lines in a main extension direction of the respective outer-rib holding elements when.

12. The holding device according to claim 10, wherein the holding unit has, for fixing a cable tie, a fourth fixing structure with further projections, the respective projections being arranged on a respective outer side of at least one of the first outer-rib holding element or the second outer-rib holding element facing away from the paths of the power lines.

13. The holding device according to claim 10, wherein one or more anti-slip structures are provided on one or more of the outer abutment surfaces.

14. The holding device according to claim 13, wherein the holding unit has, for fixing a cable tie, a fourth fixing structure with further projections, the respective projections being arranged on a respective outer side of at least one of the first outer-rib holding element or the second outer-rib holding element facing away from the paths of the power lines.

15. The holding device according to claim 13, wherein the holding unit comprises, for fixing a cable tie closed around the holding unit and the pair of power lines, a third fixing structure with at least one of a first projection or a second projection, wherein the respective projection is arranged at a free end of the first and second outer-rib holding elements, respectively, remote from the fixing unit, and projects beyond the power lines in a main extension direction of the respective outer-rib holding elements when used as intended.

16. The holding device according to claim 15, wherein the holding unit has, for fixing a cable tie, a fourth fixing structure with further projections, the respective projections being arranged on a respective outer side of at least one of the first outer-rib holding element or the second outer-rib holding element facing away from the paths of the power lines.

17. The holding device of claim 1 further comprising:
   rigid power lines, which are attached to the holding device through at least one cable tie.

18. A method for fastening a pair of rigid power lines of rectangular cross-section in a vehicle, the method comprising:
   arranging the pair of rigid power lines on the abutment surfaces of a holding device including:
      a fixing unit for fixing the holding device;
      a holding unit for holding the power lines to the holding device;

wherein the holding unit comprises an inner-rib bar element and an inner-rib holding element, both of which are arranged between a first power line path predetermined for the first power line of the pair and a second power line path predetermined for the second power line of the pair;
   wherein the inner-rib bar element has a main extension plane which is transverse to the power line paths;
   wherein the inner-rib holding element is arranged along a common main extension direction of the inner-rib holding element and of the inner-rib bar element on the inner-rib bar element;
   wherein the inner-rib holding element has, along the main extension direction, at least a first section with a first abutment surface designed to abut against the first power line and at least a second section with a second abutment surface designed to abut against the second power line; and
   wherein the inner-rib holding element is arranged in the first section at a predetermined minimum distance greater than zero from the second power line path and is arranged in the second section at a predetermined minimum distance greater than zero from the first power line path;
respectively closing at least one cable tie around the pair of power lines and the holding unit of the holding device and thus pressing the power lines against the holding unit by the respective cable tie; and
fastening the holding device to the vehicle.

* * * * *